Jan. 17, 1928.

W. E. BROCK 1,656,554

EDGE TRIMMER

Filed March 7, 1927

INVENTOR.
WILLIAM E. BROCK.

BY
Townsend, Loftus & Abbett
ATTORNEYS.

Patented Jan. 17, 1928.

1,656,554

UNITED STATES PATENT OFFICE.

WILLIAM E. BROCK, OF SACRAMENTO, CALIFORNIA.

EDGE TRIMMER.

Application filed March 7, 1927. Serial No. 173,285.

This invention relates to an edge trimmer such as employed in shoe repair shops for trimming the edge of a sole when half-soling shoes and the like.

The average shoe repair shop and particularly the more modern type of shop where you wait while your shoes are being half-soled or repaired, is equipped with numerous machines such as stitchers, stitch-pickers, heel trimmers, sole cutters, skivers, buffers, edge trimmers, etc., to facilitate and insure good, rapid and uniform workmanship.

Shoes of all types are repaired such as mens' shoes with soles of different size and thickness, ladies' and childrens' shoes, slippers, etc., with soles of different size and thickness, i. e., the repairman may be working on a ladies dress shoe or slipper with a very thin sole and the next shoe to be repaired may be a workman's shoe with a rather thick sole, etc. This continuous change from one size and type of shoe to another requires readjustment of certain machines and particularly the edge trimmers whereby the edge of a shoe sole is trimmed. This machine is provided with a revolving cutter or trimmer somewhat similar to a milling cutter and this trimmer or cutter must be removed and changed every time the thickness of the sole changes as there is a certain size or width trimmer for each thickness of sole. The trimmer is, at the present time, secured on the end of a shaft or spindle by means of a shield plate and a clamping screw engaging the same. The head of the screw is provided with a slot and cannot be removed except by means of a screw driver—hence, when the repairman wishes to remove the trimmer to replace it with a smaller or larger sized trimmer, he must first look for a screw driver and then unscrew the screw by means of the screw driver. After the screw is removed, he takes off the shield plate and the trimmer and replaces the trimmer with the desired size after which the shield plate is placed back in position and the clamping screw reinserted and tightened by means of the screw driver. These several operations take time as another worker may borrow the screw driver, it may drop on the floor, etc.

Figure 1:
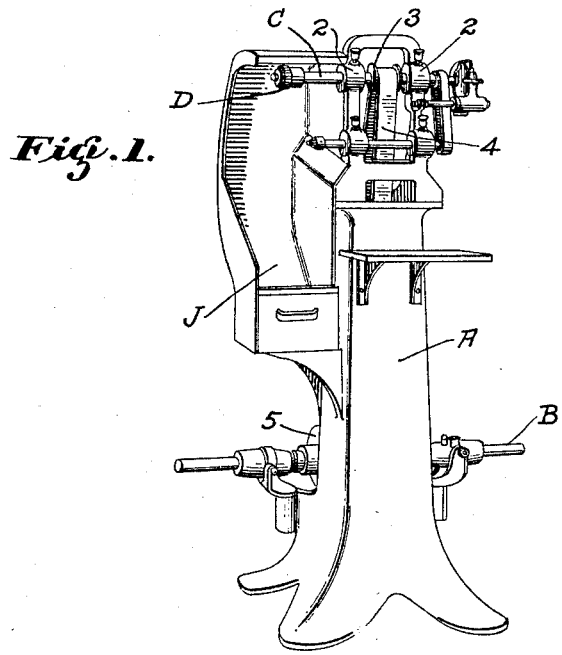
Figure 2:
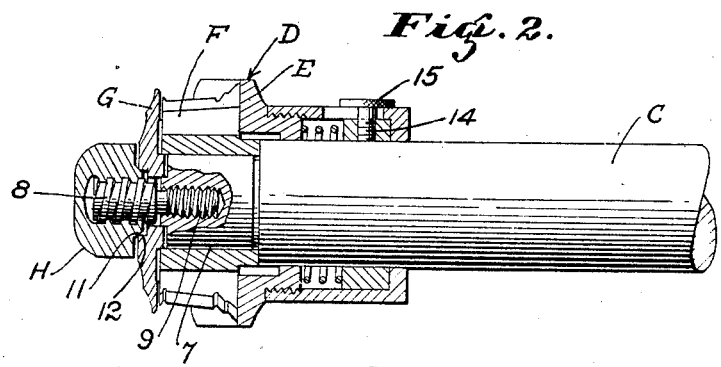
Figure 3:
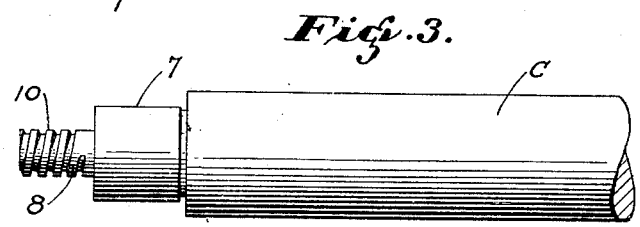

The object of the present invention is to generally improve and simplify the construction and operation of edge trimmers and particularly to provide a clamping device or nut which may be applied or removed without the use of tools such as screw drivers or the like. The invention is shown by way of illustration in the accompanying drawings in which Fig. 1 is a perspective view of an edge trimming machine, Fig. 2 is an enlarged sectional view of the trimmer, the guard, the shield plate and the clamping mechanism cooperating therewith, Fig. 3 is an enlarged detailed view of one end of the spindle or shaft on which the trimmer is secured.

Referring to the drawings in detail, A indicates a base or stand in the lower end of which is journaled a driving shaft B. Formed on the upper end of the stand is a pair of bearing members 2—2 and journaled therein is a shaft or spindle C on the outer end of which is secured an edge trimmer generally indicated at D. The shaft or spindle C is provided with a pulley 3 and this is driven by means of and endless belt 4 from shaft B by means of a pulley 5. An edge trimmer consists of the following main parts: A guard generally indicated at E, a trimmer F, a shield plate G and a clamping nut or the like indicated at H, the several parts being secured on one end of the shaft or spindle indicated at C (see Fig. 2). The spindle proper is in this instance reduced in diameter on one end as indicated at 7, the reduced portion being formed for the reception of the trimmer F. The spindle is also provided with a threaded extension 8 which may form a part of the spindle as shown in Fig. 3 or which may be attached thereto by a threaded connection such as shown at 9 in Fig. 2. The edge trimmer in common use to-day is substantially identical in construction to that shown in Fig. 2, i. e., the guard E, the trimmer F and the shield plate G are used as shown, the only difference being that the threaded extension 8 and the clamping nut H are not employed. In place thereof an ordinary screw with a slotted head is used and this must be inserted and removed by means of a screw driver whenever it is necessary to change the trimmer F. The use of a screw of that character has a number of drawbacks when time is considered. First of all it should be realized that the waste material trimmed or cut away from the edge of the sole is caught in a box or receptacle such as indicated at J (see Fig. 1). A suction pipe is often connected with the box so that the trimmings are removed and thereby prevented from collecting in excessive quantities. When the operator or repairman unscrews the clamping screw by means of a screw driver, he often wastes time, first, in finding the screw driver, secondly, when he unscrews the screw it may drop into the box J and pass from there into the suction pipe; again he may drop the shield plate G and this may also be lost. It is features of this character that are overcome to a large extent by the screw forming the subject matter of the present application. By employing a threaded extension such as shown at 8 in Fig. 7 and by using a square thread 10 thereon to receive a cap nut such as indicated at H, it is possible to remove the cap nut by merely turning it by means of the hand. The cap nut, if the operator is careless, may drop into the box J but this is not very likely. The shield plate G will not drop into the box as it remains supported on the threaded extension 8. In other words, if the operator desires to change the trimmer from a large size to a small size or vice versa, he merely unscrews the cap nut H then removes the washer G and the trimmer F. He then picks out the size trimmer he wishes to employ and slips it over the reduced end 7 of the spindle. He then applies the shield plate G and the nut H and tightens it by hand pressure. This has been found sufficient as a left-hand thread is used which causes the trimmer to automatically tighten the nut if it should happen to be loose, i. e., the trimmer rotates clockwise while the nut is applied anti-clockwise. Hence, if it is not sufficiently tight when applied, the trimmer tends to rotate anti-clockwise and thereby tightens the nut. Tightening of the nut against the square thread will not cause any jamming action and the nut can accordingly be readily removed by simply grasping the trimmer and giving it a slight twist in a clockwise direction. The nut will then be entirely free and as such can be quickly and easily removed. Where the clamping device here illustrated is applied to old machines, the only parts furnished will be the threaded extension 8 as shown in Fig. 2 together with the cap nut H, it being understood that the threaded extension 8 is provided with a threaded end 9 to fit the threads in the end of the spindle, this being also left-hand threaded. Where the attachment is applied to machines made in the factory, the threaded extension 8 may be cut directly on the end of the spindle or shaft. It should also be noted that the face of the cap nut is provided with an inner inclined shoulder 11. This engages a square shoulder 12 formed on the outer face of the shield plate. This is of material importance as it entirely avoids any jamming action between the nut and the parts clamped thereby. Another feature which might be noted is the set screw indicated at 14. This is provided with a knurled head 15 and as such may be removed or tightened when adjusting the guard E with relation to the trimmer.

While certain features of the present invention are more or less specifically described and indicated, I wish it understood that various changes may be resorted to within the scope of the appended claims; similarly, that the materials and finish of the several parts employed may be such as the manufacturer may dictate or varying conditions or uses may demand.

Having thus described my invention, what I claim and desire to secure by Latters Patent is:—

In a machine of the character described, the combination with the guard, the trimmer, the shield plate and the spindle supporting the same, of an extension formed on one end of the spindle and forming a guide and support for the shield plate, a left-hand square thread formed on said extension and a cap nut similarly threaded and adapted to be screwed over the end of the threaded extension to engage and secure the shield plate and the trimmer with relation to the spindle and an inclined annular boss on the inner face of the nut and engageable with a substantially square cut annular shoulder on the shield plate.

WILLIAM E. BROCK.